No. 721,163. PATENTED FEB. 24, 1903.
LE ROY DEVERS.
STREET CAR FENDER.
APPLICATION FILED SEPT. 18, 1902.
NO MODEL.
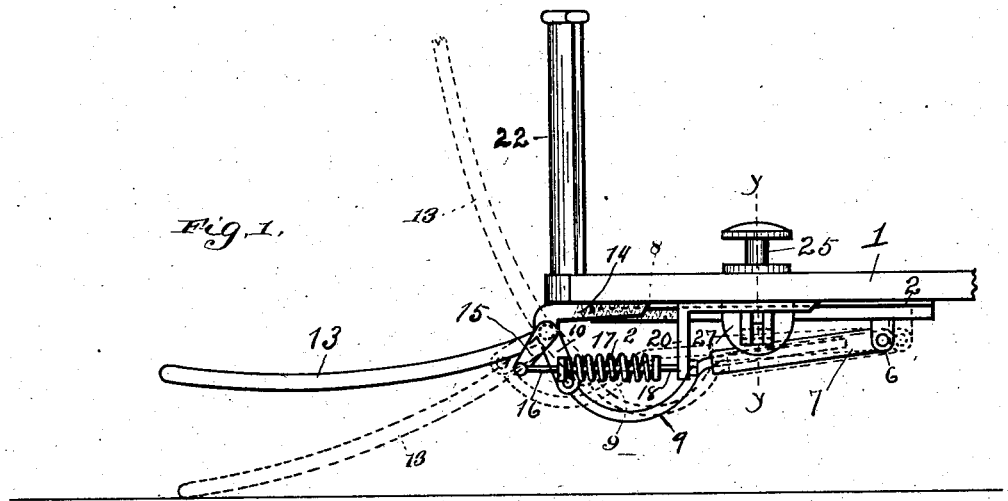
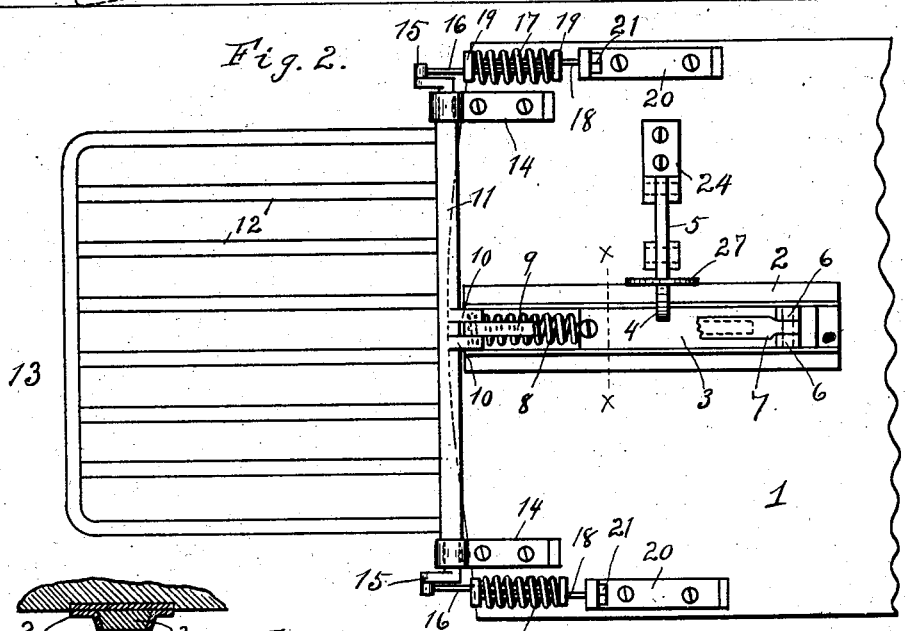
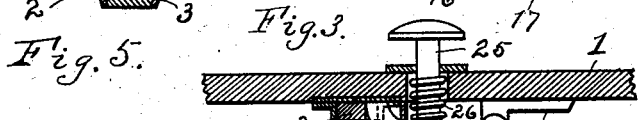
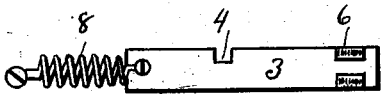
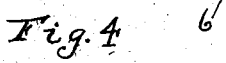

UNITED STATES PATENT OFFICE.

LE ROY DEVERS, OF DAYTON, OHIO.

STREET-CAR FENDER.

SPECIFICATION forming part of Letters Patent No. 721,163, dated February 24, 1903.

Application filed September 18, 1902. Serial No. 123,806. (No model.)

*To all whom it may concern:*

Be it known that I, LE ROY DEVERS, a citizen of the United States, residing at Dayton, in the county of Montgomery and State of Ohio, have invented certain new and useful Improvements in Street-Car Fenders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain improvements in street-car fenders, and comprises the essential features hereinafter described and claimed.

The invention is illustrated in the accompanying drawings, of which—

Figure 1 is a side elevation of the platform of a car having my improved fender applied. Fig. 2 is a plan view of the under side of the platform, showing my fender applied. Fig. 3 is a sectional view on the line $y\,y$ of Fig. 1. Fig. 4 is a detached view of the slide. Fig. 5 is a section on the line $x\,x$ of Fig. 2.

1 designates the platform of a car, to which is secured a guide 2, which slidingly supports and maintains a slide 3, the said slide 3 having a locking-notch 4 cut in one side thereof, with which a dog 5 is adapted to engage. Further reference will be made to said dog hereinafter.

6 6 designate two ears projecting from the lower side of the said slide and between which is pivoted a tube 7.

8 designates a coil-spring, one end of which is attached to an end of the slide 3 and the other end of which is attached to the floor of the guide 2.

9 designates a rod, the straight portion of which telescopes in the tube 7 and the forward end of which has a pivotal connection with a bifurcated lug 10, which projects from the transverse bar 11.

The telescopic connections 9 and 7 enable the fender to keep its lower or operative position, as shown in dotted lines in Fig. 1. The weight of the fender keeps the same in this lower position, which position is assumed when the slide 3 is tripped. At such time the weight of the fender drives the straight portion of the rod 9 into the tube 7. The rod 9 is limited in its movement into the tube 7 by the curved portion thereof, as seen in Fig. 1. When the said rod is moved into the tube 7 until limited by the curved portion thereof, the slide 3 is moved rearwardly, taking the notch 4 away from the dog 5. The fender is free when in such lower position to maintain its operative position regardless of the vibrations of the car, owing, as before stated, to the telescopic connections.

The object and purpose of the telescopic connections 9 and 7 is to enable the fender to keep its lower position, as shown in dotted lines in Fig. 1, without being affected by the vibrations of the moving car.

The bar 11, together with the parallel bars 12 and the marginal bar 13, constitutes the scoop or fender proper. The transverse bar 11 has its ends journaled in brackets 14 14, which are secured to the under side of the platform 1 at opposite points. The extreme ends of said bar 11 terminate in cranks 15 15, and the said crank ends 15 15 have connected to them rods 16 16, which pass through coil-springs 17 17 and lie parallel with adjustable rods 18 18, which also penetrate said springs. The said rods 16 18 have retaining-heads 19, which lie at each end of the springs and prevent said springs from becoming dislodged from their positions. The rods 18 pass through openings in brackets 20 20 and receive nuts 21, by means of which the tension of the springs 17 is regulated. These springs, together with the cranks 15 15, are instrumental in holding the fender in position when lowered to the dotted lines, as shown in Fig. 1, or when the said fender is elevated to a vertical position against the dash 22. The dog 5, before referred to, is pivoted at 23 to a bracket 24, the latter being secured to the under side of the platform 1.

25 is a foot-plunger which is pivoted to the middle portion of the dog 5 and is maintained in an upward position by a coil-spring 26. 27 is a guard projecting from the lower side of the platform 1 and inclosing the free end of the dog 5. The object of this guard is to maintain the dog in proper position to enter the slot 4 in the slide 3 when said dog is given over to the influence of the spring 26.

The operation of my improved fender is as follows: As shown in full lines in Fig. 1, the fender is elevated from the track and is maintained in such position by the dog 5 engaging the notch 4 in the slide 3, as shown in Figs. 2 and 3. The spring 8 is expanded when the slide 3 is moved to the rearward position. When the dog is tripped by pressure on the foot-plunger 25, the fender drops to its position shown in dotted lines in Fig. 1. The weight of the fender is sufficient to cause the sliding rod 9 to move the tube 7 and the slide 3 to the rearward position, as shown in dotted lines in Fig. 1. In this rearward movement of the slide 3 the said slide is prevented from moving rearwardly out of the guide 2 by means of the spring 8. In elevating the fender from the dotted position the rod 9 is drawn forwardly by the act of elevating said fender. In this movement the said rod 9 is not drawn entirely out of the tube 7, and as soon as the said rod 9 is drawn sufficiently forward in said tube the said tube, together with the slide 3, is drawn forward to the position shown in Fig. 2 by the compression of the spring 8.

In conclusion it may be stated that the function of the spring 8 is to draw the slide 3 to its forward position as the fender is being elevated to the full position, as shown in Fig. 1. This forward position of the slide is essential in order that the notch 4 may be brought to a position to be engaged by the dog 5, as shown in Fig. 2.

It will be understood that the act of elevating the fender withdraws the rod 9 from the tube 7 a sufficient extent to give the slide 3 over to the compressing influence of the spring 8. When the fender is elevated, it will have more or less flexibility of its own, which is due to the telescopic connections 9 and 7 between the fender and the slide 3. Such flexibility will not permit the fender to move to its lower or operative position, however, owing to the dog holding the slide 3 in the forward position and the curve in the rod 9 limiting the telescopic movement of said rod within the tube 7. The telescopic connections 9 and 7 also permit the fender to be elevated in a vertical position against the dash 22 when it is desired to couple a car to that end of the car containing the fender. When the fender is thus moved to the vertical position, the rod 9 is drawn to its outermost position in the tube 7. In short, it will be understood that when the fender is lowered to its operative position the rod 9 is projected into the tube 7 to its limit, and when the fender is elevated against the dash the said rod is drawn outwardly in said tube to its limit, but not entirely out of the tube.

Having described my invention, I claim—

1. The combination of a fender, a slidable rod pivoted to said fender, a tube in which said rod is supported, a slide to which said tube is pivoted, a spring controlling said slide when the fender is being elevated to a position above the track, and a dog adapted to engage said slide and to hold it in a position to maintain the fender in such elevated position or to release said fender and permit it to descend to the track, substantially as specified.

2. The combination of a fender having a transverse portion terminating in cranks, springs adapted to exert a pressure to maintain said fender in its lower position, a rod pivoted to the transverse portion of said fender, a tube into which said bar projects and is confined, a slide to which said tube has a pivotal connection, a spring controlling said slide when the fender is being elevated and whereby the said slide is moved to its forward position, a dog adapted to engage said slide when thus moved to its forward position and whereby the fender is maintained in an elevated position, and means for tripping said dog to release the slide and thereby permit the fender to lower to an operative position, substantially as specified.

In testimony whereof I affix my signature in presence of two witnesses.

LE ROY DEVERS.

Witnesses:
R. J. McCarty,
W. H. Wisman.